Dec. 14, 1965 R. J. JOHNSON 3,223,978

END MARKING SWITCH MATRIX UTILIZING NEGATIVE IMPEDANCE CROSSPOINTS

Filed June 8, 1962 2 Sheets-Sheet 1

INVENTOR

ROBERT JOEL JOHNSON

BY Hurwitz & Rose

ATTORNEYS

INVENTOR
ROBERT JOEL JOHNSON

BY Hurwitz & Rose

ATTORNEYS 3,223,978
END MARKING SWITCH MATRIX UTILIZING NEGATIVE IMPEDANCE CROSSPOINTS

Robert J. Johnson, Winter Park, Fla., assignor to Radiation Inc., Melbourne, Fla., a corporation of Florida Filed June 8, 1962, Ser. No. 201,106
11 Claims. (Cl. 340—166)

The present invention relates generally to switching matrices and more particularly to end marking switching matrices utilizing negative impedance elements for cross point switching.

An end marking switching matrix is one wherein only origin and destination information is necessary for establishing connections between selected ones of multiple input and output points. Presently available end marking switching matrices usually have the desired output grounded while control potential is applied to the desired input point. The control potential must be of sufficient amplitude to cause simultaneous activation of all three crosspoints or switching points within the matrix to break the line down into conduction. This has not proven completely satisfactory since the route through the matrix is unpredictable, and because of the high voltages which must be transmitted from the source to the matrix.

In the present invention definite interconnections between the input and output terminals of the end marking switch matrix are established by a path containing three negative impedance cross-over or switching points. Routing through the matrix is controlled by opposite polarity pulses which are applied to the designated input and output terminals. Thereby, the amplitude of the route finding pulses is considerably reduced.

The route designating pulses applied to the matrix enable separate negative impedance elements at the inputs and outputs of the matrix. When the impedances are enabled, they are simultaneously switched from a substantially off-condition to a negative impedance condition when clock pulses are applied thereto. This causes the third impedance to switch from a non-conducting to a negative impedance state so that a substantially zero impedance path, maintained at zero potential, is established between the matrix input and output terminals.

The characteristic of the negative impedance elements is such that they are maintained at a substantially cut-off condition until both control voltages are applied to them. Application of only one control voltage to an element does not switch it from cut-off to negative impedance.

A plurality of paths between each input and output terminal are provided. Each of these paths includes a separate, third, negative impedance between the input and output negative impedance elements. Multiple input and output terminals are provided, each of which is responsive to separate route designation signals. The plural paths between each input and output terminal are enabled by application of sequential clock pulses to different input and output impedances.

Once a path is established between a pair of input and output terminals, it is maintained after the clock pulse is removed from the negative impedance. This is accomplished by supplying the proper amount of current to the negative impedance from the input and output destination signals so that the negative impedance remains at a highly conductive low positive impedance state.

Intelligence signals, such as employed in telephony, are transmitted through the low impedance, zero voltage paths. The signals are of considerably different frequency than the frequency at which the clock pulses are applied to the matrices to eliminate cross talk. So, once a path is in use or is "busy" subsequent clock pulses have no effect on the intelligence transmitted through the matrix.

It is an object of the present invention to provide a new and improved end marking switching matrix.

It is another object of the present invention to provide an end marking switching matrix utilizing negative impedance elements as cross points.

It is a further object to provide an end marking switching matrix wherein the route through the matrix is determined by a pair of opposite polarity voltages which are of lower amplitude than the control voltages previously employed.

Another object of the present invention is to provide an end marking switching matrix in which multiple routes between specific input and output terminals are possible but wherein the establishment of one route precludes establishment of other routes.

A further object of the present invention is to provide an end marking switching matrix wherein the connecting route between the matrix input and output terminals is maintained at substantially zero impedance and voltage conditions by utilizing negative impedance elements as cross points.

An additional object of the present invention is to provide a new and improved end marking switching matrix utilizing negative impedance cross points wherein route determining clock pulses have no effect on the intelligence transmitted through an established route.

The above and still further objects, features and advantages of the present invention will become apparent upon consideration of the following detailed description of one specific embodiment thereof, especially when taken in conjunction with the accompanying drawings, wherein.

Figure 1:
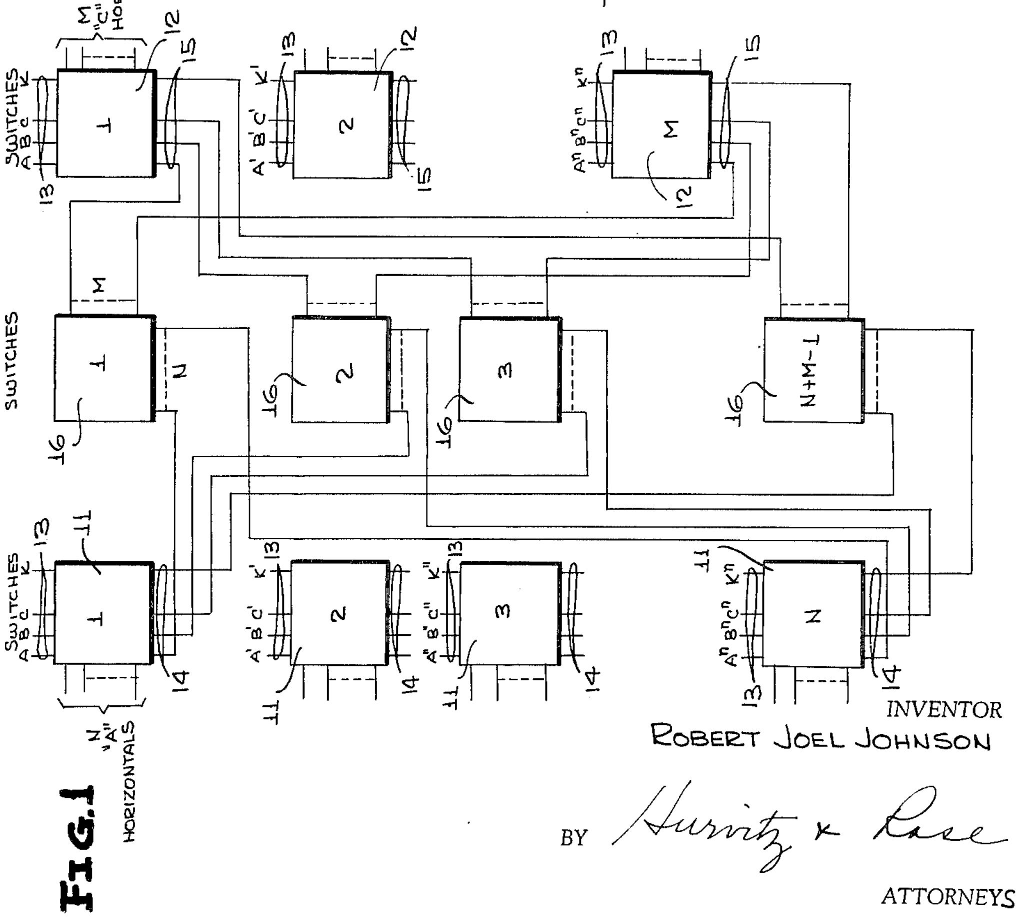
FIGURE 1 is a block diagram of the complete system of the present invention.

Reference is now made to FIGURE 1 of the drawings which discloses in block diagram form a system for connecting any of the $N^2$ input leads on the left side of the circuit to any of the $M^2$ output leads on the right side. N switching matrices 11, each having N horizontal input leads, and M switching matrices 12, each having M horizontal input leads, are provided for establishing connections between the $N^2$ and $M^2$ leads. Thus the $N^2$ leads are considered as being divided into N groups of N leads and the $M^2$ leads are divided into M groups of M leads.

The desired route or signal path through the system is established by activating the selected one of the $N^2$ leads and the selected one of the $M^2$ leads. In a telephone type switchboard, the seize tone detector circuit activates the selected one of the $N^2$ leads while the link alloter circuit and the seize tone combine to activate the selected one of the $M^2$ leads.

To control the exact internal matrix route between the $N^2$ and $M^2$ leads, each of the switch matrices 11 and 12 are provided with K input leads. Trigger pulses are applied simultaneously to the leads 13 having similar designation. These trigger pulses are subsequently applied to the leads of the next designation so as to step the outputs of matrices 11 and 12 from the output lead to the next. Thus, the A leads of each of the matrices 11 and 12 are simultaneously activated and subsequently the B leads of each of the matrices 11 and 12 are activated. These leads are activated at a sufficiently high frequency to prevent any crosstalk with them and the audio intelligence signals that are applied to the matrices.

If an input pulse is applied to one of the N horizontal leads of any one of the switching matrices 11, output pulses are sequentially derived on leads 14 in response to the sequential application of trigger pulses to the K leads 13. Similarly, activation of one of the M leads applied to switches 12 results in sequential application of output pulses on leads 15 as trigger pulses are applied to the K input leads 13 to matrices 12.

The K output leads of each of the matrices 11 and 12 are applied to switch matrices 16 to control the connections between the M and N input leads. The vertical input leads to switches 16 are connected to the output leads 14 of matrices 11 so that the first vertical input lead of each switch 16 is connected to a different one of the output leads of the first switch 11. The second vertical input lead to each of the switches 16 is derived from the output leads of the second switch element 11. In general, the Ith vertical input lead of the Jth switch 16 is connected to the Jth vertical output lead of the Ith switch one of matrices 11. The Lth horizontal input lead to the Jth one of the switches 16 is connected to the Jth output leads of the Lth one of the matrices 12. Thus, the horizontal input leads to the first one of the matrices 16 are connected to the first output leads of each of the M matrices 12 while the M input leads to the second one of the matrices 16 are derived from the second output leads of each of the M switching matrices 12.

In a system where the transmission path between the $N^2$ input leads and the $M^2$ input leads is blocked, $N+M-1$ switches 16 must be provided and K, the number of output leads of switching matrices 11 and 12 equals $N+M-1$. This quickly establishes the transmission path between the designated input leads. If the circuit is of the normally unblocked type and it is desired to block certain paths, depending upon the application of input pulses to matrices 11 and 12, the number of vertical outputs from switches 11 and 12 and in consequence the number of switches 16 is reduced.

For the normally blocked transmission connective system, there are $N+M-1$ separate paths between each of the input leads to matrices 11 and 12. The connections established depends upon the relative time of occurrence between the pulses applied to the $N^2$ and $M^2$ leads of matrices 11 and 12 with respect to the trigger pulses. Once a connection is established, it is not possible to establish a further connection between the same two leads because of the nature of the circuitry employed in the switching matrices 11, 12 and 16.

Figure 2:
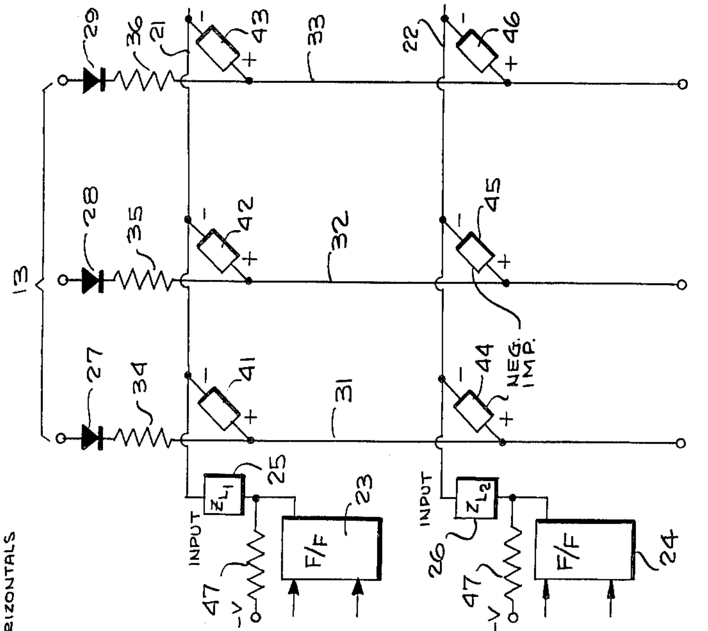
FIGURE 2 is a schematic diagram of the A and C switches of FIGURE 1.

Reference is now made to FIGURE 2 which discloses a specific form of one of the switching matrices 11. In the matrix of FIGURE 2, it is assumed that there are two horizontal inputs and three vertical outputs. The horizontal input leads 21 and 22 are activated by bistable multivibrators or flip-flops 23 and 24, respectively. With flip-flops 23 and 24 unactivated, i.e. in a reset condition, no voltage is applied via load resistors 47 to leads 21 and 22. When an activating pulse is applied to the bistable multivibrators 23 or 24, a negative level is produced on the respective leads 21 and 22.

Trigger pulses are applied to the anodes of diodes 27, 28 and 29 to sequentially apply positive voltages on leads 31, 32, and 33, respectively via isolating resistors 34, 35 and 36.

Normally cut-off or non-conducting negative impedance elements 41–46 are interconnected at each intersection of the horizontal leads 21 and 22 with the vertical leads 31–33. The negative impedance elements are poled so that the negative output voltage of bistable multivibrators 23 and 24 in combination with a positive pulse on one of the leads 31–33 results in their changing from a non-conducting to a negative impedance state. Thus, if an activating pulse is aplied to bistable multivibrator 24, a negative voltage is applied to lead 22.

If the next trigger pulse after the application of the negative voltage on lead 22 is applied to diode 28, the voltage across negative impedance element 45 will be such as to cause element 45 to provide a negative impedance path between leads 22 and 32. When the trigger pulse is removed from diode 28, this negative impedance path becomes a low positive impedance due to the characteristic of the negative impedance elements. When the next trigger pulse is applied to diode 29, no current path is established between leads 33 and 22 because the voltage on lead 22 is insufficient to fire negative impedance 46 because of the voltage drop across the resistor 47. Accordingly, a low impedance path is established through only one of the negatiive impedance elements between the vertical leads 31–33 and the horizontal lead 22.

An intelligence source which is to be coupled between $N^2$ input leads to matrices 11 and the designated M lead of matrices 12 is coupled via $Z_L$ which is in series with input horizontals 21 or 22. A circuit element having the desired characteristics of $Z_{L_1}$ and $Z_{L_2}$ is an input transformer, the secondary of which is connected in series with leads 21 or 22. The input transformer also provides direct current isolation to the input circuit. This intelligence signal is coupled to the selected output lead via the negative impedance element which has been fired as described supra and as will be described in more detail infra.

The construction of each of the switches 12 is identical to that illustrated in FIGURE 2 except that the polarity of the diodes 27–29 is reversed because the trigger pulses applied thereto are of negative rather than positive polarity and the activating outputs of bistable multivibrators 23 and 24 are positive, rather than negative. In consequence, the negative impedance elements are poled in the opposite direction illustrated in FIGURE 2.

Figures 3, 4, 5:
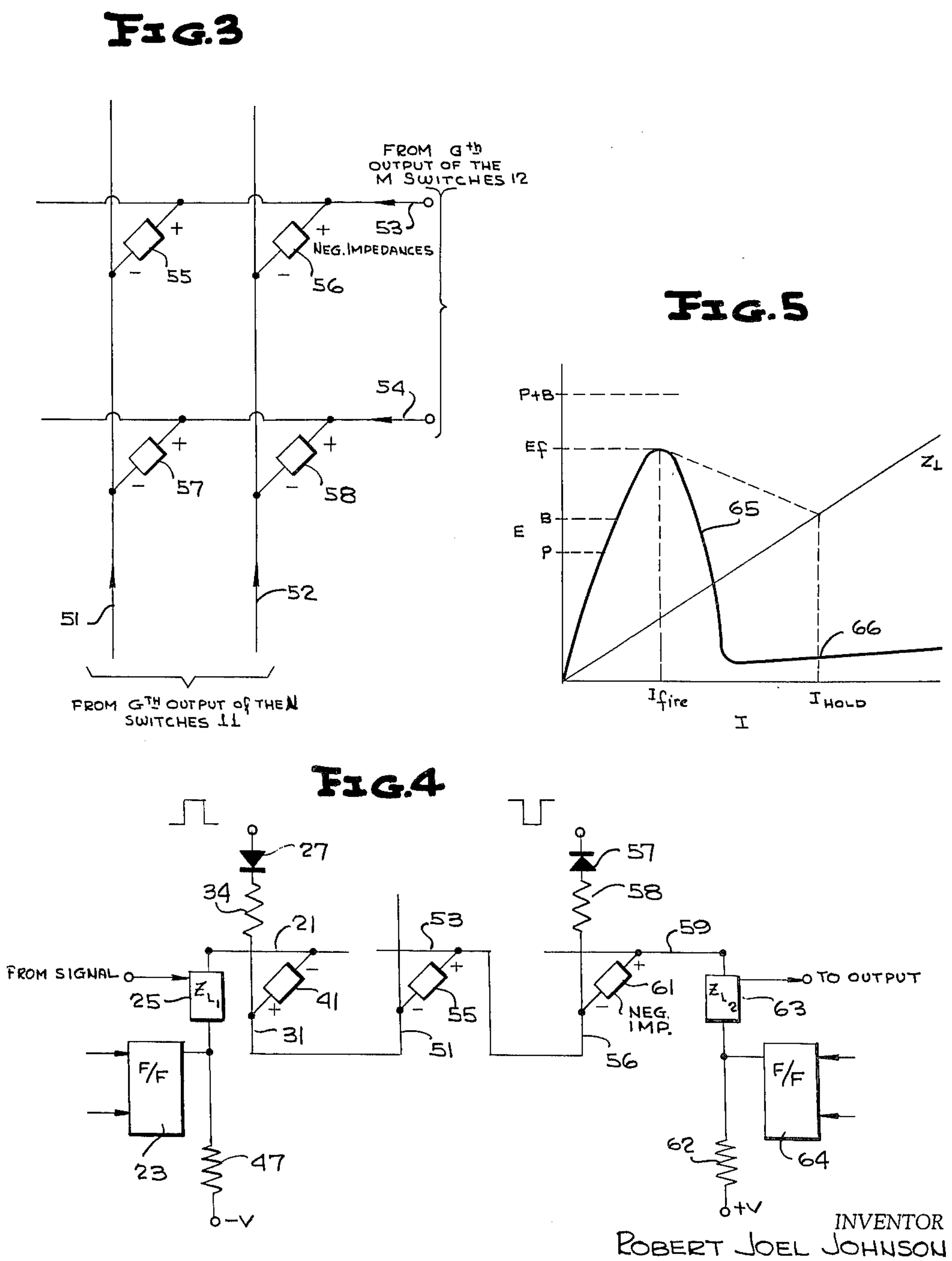
FIGURE 3 is a schematic diagram of the B switches of FIGURE 1.
FIGURE 4 is a schematic diagram of a matrix route between the switches of FIGURE 1.
FIGURE 5 is a characteristic curve of the negative impedance element utilized in the present invention.

Reference is now made to FIGURE 3 of the drawings which illustrates the construction, in schematic form, of one of the switches 16. It is assumed for the purposes of the illustrative example of FIGURE 3, that the matrices 11 and 12 have two horizontal inputs each. In such a situation there are provided three switches 16.

The switch illustrated in FIGURE 3 is designated as the first of the three switches and the vertical leads 51 and 52 are connected to the first leads of the first and second switches 11, respectively. The horizontal leads 53 and 54 are connected to the first leads of the first and second switches 12, respectively. Vertical leads 51 and 52 are interconnected with horizontal leads 53 and 54 via negative impedance elements 55–58. Elements 55–58 are poled so that they fire or change state with the simultaneous application of a negative voltage applied thereto via vertical leads 51 and 52 and of a positive voltage via leads 53 and 54. Firing of one of the negative impedance elements, establishes a low impedance path between the horizontal and vertical leads which are activated. In this manner, intelligence applied to leads 51 or 52 is coupled to leads 53 and 54 and selection of the route is accomplished depending upon the selection of the activated leads.

Reference is now made to FIGURE 4 of the drawings which discloses a matrix route established between an input lead to one of the matrices 11 and one of the leads to one of the matrices 12. It is assumed that the route established in FIGURE 4 contains bistable mulivibrators 23, signal input device 25 connected to its output, horizontal line 21 connected to signal input device 25, and vertical line 31 in the associated circuitry of FIGURE 2. The vertical line 31 is connected to vertical line 51 of FIGURE 3 and to horizontal line 53 via negative impedance 55. Connected to horizontal line 53 of the switching matrix 16 is vertical line 56 which is connected to isolating diode 57 via limiting resistor 58. Diode 57 is poled so that only negative pulses applied to the cathode thereof are applied to resistor 58 and lead 56. Lead 56 is connected to horizontal lead 59 via negative impedance crosspoint element 61. Lead 59 is connected by an isolating output device 63 to the load which the signal applied to input device 25 is coupled when a current path is established through negative impedance elements 41, 55 and 61.

Control of the voltage applied to lead 59 is effected through resistor 62 which is connected to bistable multivibrator or flip-flop 64. Flip-flop 64 applies a positive voltage to lead 59 by way of the output device 63 when it is activated in response to the link alloter circuit and the seize tone detector. When bistable multivibrator 64 is unactivated, its output voltage is zero and has no effect on lead 59.

The negative impedance elements employed in the present circuit have a current versus voltage characteristic as illustrated in FIGURE 5 of the drawings. Available devices which have this characteristic are the Shockley diode or the binistor. The magnitude of the voltage developed by bistable multivibrator 23 or 64 is designated B while the magnitude of the voltage applied to diodes 27 and 57 by the trigger pulses is designated P on the voltage axis of the characteristic plot. Thus, if the negative impedance element 41 or 61 previously had zero volts across it, neither P nor B by itself is sufficient to cause the negative impedance element to fire, i.e., to reach the maximum point $E_f$ on the plot. Upon removal of either of the voltages applied to the negative impedance element by leads 21 or 31, the impedance will again be returned to its zero point and will not be fired.

When a negative voltage is developed by bistable multivibrator 23 at the same time that a trigger positive pulse is applied to the anode of diode 27, the combined voltage across negative impedance 41 is sufficient to cause the impedance to fire and conduct heavily in its negative impedance region 65. Because of the polarity of impedance 41, and the fact that resistance 34 is of much greater impedance than impedance 25, the voltage on lead 31 is maintained substantially at the same negative voltage as developed at the output lead of flip-flop 23. Similarly, the relative values of resistance 58 and load 63 are such as to maintain a positive voltage on lead 53 of the same value as derived at the output lead of flip-flop 64 when cross point 61 is fired.

The values of the output voltages of flip-flops 23 and 64 applied on leads 51 and 53 across negative impedance cross points 55 are such that the negative impedance is not fired unless both leads are activated. If a voltage is applied to only one of the leads 51 or 53 from the flip-flops 23 or 64, impedance 55 is not activated and no current path exists between leads 21 and 59. If voltages are applied to both leads 51 and 53 from flip-flops 23 and 64, however, a conduction path exists between leads 21 and 59 and this conduction path is maintained at zero voltage. This may be seen since the output voltages of flip-flops 23 and 64 are of equal but opposite magnitude and the value of impedances 25 and 63 is equal.

When the trigger pulses are removed from diodes 27 and 57, the impedance elements 41, 55 and 61 continue to conduct heavily with a very small voltage across them since they are driven to point 66 in the positive impedance region of their characteristic curve. Once the impedance elements are fired, they operate on the positive impedance portion of their characteristic curve wherein current conduction is greater than in the negative impedance zone. This occurs at a point where a very small voltage is developed across the impedance elements so that they are low positive impedances once fired. The point on the characteristic curve at which the impedance element operates once it is fired is determined by the load resistance the element sees. The line hold current flowing through the negative impedance elements 41, 55 and 61, i.e. the current which maintains the route once it is established, is $V/R$; where R is the value of each of the resistances 47 or 62; and V is the magnitude of the voltages applied to resistances 47 and 62. The intelligence signal applied to input device 25 must not supply more current to line 21 than the line hold current because the negative impedance elements will then be driven to cut off and the circuit between leads 21 and 59 broken.

The negative impedance remains at point 66 until the voltage derived from one of the flip-flops 23 or 64 is reset to zero. This returns the negative impedance back to the origin i.e. the point where the current flowing through it and consequently the voltage across it are zero.

Once a connection is established between leads 21 and 59, the subsequent application of triggering pulses to diodes 27 and 57 has no effect on the audio frequency, intelligence signal being transmitted from input device 25 to output device 63 since the current derived from the trigger pulses is substantially zero compared to the line hold current. This is evident since the impedance of resistor 34 is much greater than the two parallel impedances 47 and 62. Any tendency of the trigger pulses to effect the line hold current is rendered negligible on the transmitted intelligence since the frequency of the trigger pulses is considerably greater than the audio frequency of the intelligence transmitted through the matrix between input device 25 and output device 63.

While I have described and illustrated one specific embodiment of my invention, it will be clear that variations of the details of construction which are specifically illustrated and described may be resorted to without departing from the true spirit and scope of the invention as defined in the appended claims.

What I claim is:

1. In a matrix, a route of zero potential difference between an input and output terminal comprising: first, second, and third elements each having a substantially nonconductive state, a negative impedance state and a positive impedance state, said elements being connected in series between said input and output terminals, said elements normally being in said non-conductive state, each of said elements being activated through said negative impedance state into said positive impedance state only when the voltage applied thereto exceeds a predetermined amplitude; means connected across said first element for providing a first voltage thereto in excess of said predetermined amplitude to thereby activate said first element into said positive impedance state; means connected across said third element for providing a second voltage thereto in excess of said predetermined amplitude to thereby activate said third element into said positive impedance state; said first and second voltages being of substantially equal magnitude but of opposite polarity; said second element being activated into said positive impedance state only in response to the simultaneous activation of said first and third elements into the positive impedance state.

2. The combination of claim 1 wherein said means for providing a first voltage includes a pair of opposite polarity voltage sources connected to opposite ends of said first element and wherein said means for providing a second voltage includes another pair of opposite polarity voltage sources connected to opposite ends of said third element.

3. In a matrix for coupling intelligence from one of a plurality of input terminals to one of a plurality of output terminals; first, second and third elements each having a high and low stable impedance state and a negative impedance state, said elements being connected in series between said one of said plurality of input terminals and said one of said plurality of output terminals, said elements normally being in said high impedance state, each of said elements being activated through said negative impedance state into said low impedance state only when the voltage applied thereto exceeds a predetermined amplitude; means connected across said first element for providing a first voltage thereto in excess of said predetermined amplitude to thereby activate said first element into said low impedance state; means connected across said third element for providing a second voltage thereto in excess of said predetermined amplitude to thereby activate said third element into said low impedance state; said first and second voltages being of substantially equal magnitude but of opposite polarity; said second element being activated into said low impedance state only in response to the simultaneous activation of said first and third elements into the low impedance state.

4. The combination of claim 3 wherein said means for providing a first voltage includes a pair of opposite polarity voltage sources connected to opposite ends of said first element and wherein said means for providing a second voltage includes another pair of opposite polarity voltage sources connected to opposite ends of said third element.

5. An end marking switching matrix comprising: a plurality of input terminals and a plurality of output terminals; and a multiplicity of selectively conducting paths between each of said plurality of input terminals and each of said plurality of output terminals, each of said paths including: first, second and third elements each having a high and low stable impedance state and a negative impedance state, said elements being connected in series between each of said plurality of input terminals and each of said plurality of output terminals, said elements normally being in said high impedance state, each of said elements being activated through said negative impedance state into said low impedance state only when the voltage applied thereto exceeds a predetermined amplitude; means connected across said first element for providing a first voltage thereto in excess of said predetermined amplitude to thereby activate said first element into said low impedance state; means connected across said third element for providing a second voltage thereto in excess of said predetermined amplitude to thereby activate said third element into said low impedance state; said first and second voltages being of substantially equal magnitude but of opposite polarity; said second element being activated into said low impedance state only in response to the simultaneous activation of said first and third elements into the low impedance state.

6. The combination of claim 3 wherein said means for providing a first voltage includes a pair of opposite polarity voltage sources connected to opposite ends of said first element and wherein said means for providing a second voltage includes another pair of opposite polarity voltage sources connected to opposite ends of said third element.

7. An end marking switch matrix comprising: N groups of N input terminals and M groups of M output terminals, where N and M are integers which are equal to or greater than 1; $N+M-1$ groups of impedance elements, the impedance elements in each of said $N+M-1$ groups being arranged in N columns and M rows; each of said impedance elements having a substantially non-conducting state and a conducting state; and means for sequentially establishing $N+M-1$ different paths between any of said input terminals and any of said output terminals, said last-mentioned means including: means for connecting any of said N input terminals of the Lth group of input terminals sequentially to the Lth columns of said $N+M-1$ groups of impedance elements, where L is an integer which is equal to or greater than 1 and equal to or less than N; and means for connecting any of said M output terminals of the Ith group of output terminals sequentially to the Ith rows of said $N+M-1$ groups of impedance elements, where I is an integer which is equal to or greater than 1 and equal to or less than M.

8. The combination of claim 7 further comprising means for enabling the Jth path of said $N+M-1$ different paths, where J is an integer which is equal to or greater than 1 and equal to or less than $N+M-1$, comprising: means for applying a first control signal to one of said N input terminals of the Lth group of input terminals; and means operative simultaneously with said last named means for applying a second control signal to one of said M output terminals of the Ith group of output terminals, the impedance element in the Lth column and the Ith row of the Jth group of $N+M-1$ impedance elements changing from said non-conducting state to said conducting state upon the simultaneous application of said first and second control signals.

9. The combination of claim 7 wherein said means for connecting any of said input terminals sequentially to said $N+M-1$ groups of impedance elements comprises: N groups of impedance elements, the impedance elements in each of said N groups being arranged in N rows and $N+M-1$ columns; means for connecting the N input terminals of different ones of said N groups of N input terminals to the N rows of different ones of said N groups of impedance elements; means for connecting the $N+M-1$ columns of the Lth group of said N groups of impedance elements one for one to the Lth columns of said $N+M-1$ groups of impedance elements; and means for connecting any of said N rows of the Lth group of N groups of impedance elements sequentially to the $N+M-1$ columns of said Lth group of N groups of impedance elements.

10. The combination of claim 9 wherein said means for connecting any of said output terminals sequentially to said $N+M-1$ groups of impedance elements comprises: M groups of impedance elements, the impedance elements in each of said M groups being arranged in M rows and $N+M-1$ columns; means for connecting the M output terminals of different ones of said M groups of M output terminals to the M rows of different ones of said M groups of impedance elements; means for connecting the $N+M-1$ columns of the Ith group of said M groups of impedance elements one for one to the Ith rows of said $N+M-1$ groups of impedance elements; and means for connecting any of said M rows of the Ith group of M groups of impedance elements sequentially to the $N+M-1$ columns of said Ith group of M groups of impedance elements.

11. The combination of claim 10 further comprising means for enabling the Jth path of said $N+M-1$ different paths, where J is an integer which is equal to or greater than 1 and equal to or less than $N+M-1$, comprising: means for applying a first enabling signal to one of said N input terminals of the Lth group of input terminals; means for applying a second enabling signal to one of said M output terminals of the Ith group of output terminals; and means for simultaneously applying first and second control signals to the Jth column of said Lth group of N groups of impedance elements and to the Jth column of said Ith group of M groups of impedance elements, the impedance element in the Lth column and the Ith row of the Jth group of said $N+M-1$ groups of impedance elements changing from said non-conducting state to said conducting state upon the simultaneous application of said first and second control signals.

References Cited by the Examiner

UNITED STATES PATENTS

| | | | |
|---|---|---|---|
| 2,855,524 | 10/1958 | Shockley | 307—88.5 |
| 2,859,284 | 11/1958 | Ketchlege | 179—18.7 |
| 2,946,855 | 7/1960 | Hussey | 179—18 |
| 2,992,409 | 7/1961 | Lawrence | 340—166 |
| 3,103,597 | 9/1963 | Novick et al. | 307—88.5 |
| 3,141,067 | 7/1964 | Spandorfer | 179—18.7 |

FOREIGN PATENTS

| | | |
|---|---|---|
| 1,257,655 | 2/1961 | France. |
| 945,373 | 12/1963 | Great Britain. |

NEIL C. READ, *Primary Examiner.*

P. XIARHOS, *Assistant Examiner.*